UNITED STATES PATENT OFFICE 1,946,704

VULCANIZATION OF RUBBER

George L. Magoun, Nitro, W. Va., assignor to The Rubber Service Laboratories Company, Akron, Ohio, a corporation of Ohio No Drawing. Application May 7, 1932
Serial No. 609,975

30 Claims. (Cl. 18—53)

The present invention relates to the vulcanization of rubber by an improved process wherein a new class of materials are employed as accelerators in the vulcanization step. More particularly, the present invention relates to the vulcanization of rubber in the presence of a vulcanization accelerator comprising a reaction product of an acid amide imido halide and a mercaptothiazole. The acid amide imido halides as appearing in the present specification and claims have the general formula of $$R—C=N—R'$$
$$|$$
$$X$$

where R is an unsubstituted alkyl radical or an aryl hydrocarbon radical of the benzene series, R' is an aromatic hydrocarbon radical and X is a halogen atom.

The preferred means of manufacturing the new class of compounds and their use as accelerators in the rubber vulcanization process will be understood from the following description and examples.

One of the preferred type of compounds, for example the reaction product of benzanilide-imido-chloride and the sodium salt of mercaptobenzothiazole was prepared in the following manner:

Substantially equi-molecular proportions of benzanilide and phosphorus pentachloride were placed in a reactor equipped with agitating means and heated to a temperature of 140–145° C. while agitating. After the reaction was completed, the hydrochloric acid gas and phosphorus oxy chloride formed as by-products of the reaction were removed from the reaction mixture preferably by distillation under reduced pressure. The residual product thus obtained comprises crude benzanilide-imido-chloride, which according to Berichte der Deutschen Chemischen Gesellschaft 19, 992 (1886) possesses the chemical formula of

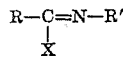

Substantially 0.1 of a molecular proportion of benzanilide-imido-chloride prepared in the manner described, was added to a suspension of the anhydrous sodium salt of mercaptobenzothiazole in a suitable solvent, for example petroleum ether, and allowed to react therewith preferably at room temperature. On completion of the reaction, the desired reaction product together with sodium chloride formed as a by-product precipitated from the solvent medium and was separated therefrom preferably by filtration. After washing the precipitated material with water and an aqueous solution of sodium carbonate to eliminate the sodium chloride formed and any unreacted mercaptobenzothiazole present, the resultant product after drying was a yellow powder melting at 157–159° C.

The reaction product of benzanilide-imido-chloride and the sodium salt of mercaptobenzothiazole, prepared in the manner described, was incorporated in a typical gum stock comprising 100 parts of pale crepe rubber,
5 parts of zinc oxide,
3 parts of sulfur,
1 part of stearic acid,
1 part of the reaction product of the sodium salt of mercaptobenzothiazole and benzanilide-imido-chloride.

The rubber stock thus compounded was cured by heating in a press for different times at 30 pounds steam pressure per square inch. After vulcanizing, the cured rubber product was found to possess the following tensile and modulus characteristics.

Table I

| Cure | | Modulus of elasticity in lbs/in² at elongations of | | | Tensile at break in lbs/in² | Ultimate elongation |
|---|---|---|---|---|---|---|
| Time mins. | Steam pressure lbs. | 300% | 500% | 700% | | Percent |
| 30 | 30 | 47 | 54 | 96 | 577 | 1,090 |
| 45 | 30 | 74 | 128 | 288 | 1,000 | 910 |
| 60 | 30 | 111 | 195 | 530 | 1,675 | 875 |

The data set forth in Table I show that the preferred class of compounds, for example, the reaction product of the sodium salt of mercaptobenzothiazole and benzanilide-imido-chloride possesses accelerating properties. The accelerating properties of the preferred class of accelerating compounds are greatly increased, however, when employed in conjunction with basic activating accelerators as diphenyl guanidine, di-ortho tolyl guanidine, p,p'diamino diphenyl methane, 2,4 diamino diphenyl amine and the like. As a further embodiment of the invention the reaction product of the sodium salt of mercaptobenzothiazole and benzanilide-imido-chloride was incorporated in a rubber stock in the well known manner comprising 100 parts of pale crepe rubber,
5 parts of zinc oxide,
3 parts of sulfur,
1 part of stearic acid,
0.8 part of the reaction product of the sodium salt of mercaptobenzothiazole and benzanilide-imido-chloride,
0.2 part of diphenyl guanidine.

The rubber stock thus compounded was vulcanized and the cured rubber product found on testing to possess the following tensile and modulus characteristics:

Table II

| Cure | | Modulus of elasticity in lbs/in² at elongations of | | | Tensile at break in lbs/in² | Ultimate elongation |
|---|---|---|---|---|---|---|
| Time mins. | Steam pressure lbs. | 300% | 500% | 700% | | |
| | | | | | | Percent |
| 30 | 30 | 151 | 311 | 973 | 2710 | 870 |
| 45 | 30 | 189 | 389 | 1555 | 3450 | 840 |
| 60 | 30 | 238 | 480 | 1918 | 3815 | 820 |

It is seen from the data set forth above that, while the reaction product of benzanilide-imido-chloride and a mercaptothiazole, for example, the sodium salt of mercaptobenzothiazole alone possesses accelerating properties, these accelerating properties are markedly increased when the preferred class of materials are employed in conjunction with a basic activating accelerator, as for example diphenyl guanidine.

Further examples of the preferred class of accelerating compounds that have been prepared in a manner analogous to that hereinbefore described comprise the reaction product of substantially equi-molecular proportions of the sodium salt of mercaptobenzothiazole and acetanilide-imido-chloride (a dark brown resin), reaction product of substantially equi-molecular proportions of benzoyl-p-toluidide-imido-chloride and the sodium salt of mercaptobenzothiazole (a solid which after purification melted at 170-172° C., reaction product of substantially equi-molecular proportions of benzoyl alpha naphthylamido-imido-chloride and the sodium salt of mercaptobenzothiazole (a solid which after purification melted at 186-188° C.), the reaction product of substantially equi-molecular proportions of benzoyl-p-toluidide-imido-chloride and the sodium salt of mercaptotolylthiazole (a solid melting at 120-136° C.), the reaction product of substantially equi-molecular proportions of acet-p-toluidide-imido-chloride and the sodium salt of mercaptonaphthothiazole (a dark resin), the reaction product of substantially equi-molecular proportions acet alpha naphthylamide-imido-chloride and the sodium salt of mercaptobenzothiazole (a dark resin).

The materials specified above were separately compounded in a rubber stock comprising 100 parts of pale crepe rubber,
5 parts of zinc oxide,
3 parts of sulfur,
1 part of stearic acid,
1 part of the above defined accelerators.

The rubber stocks so compounded were vulcanized by heating in a press in the well known manner for 30, 45 and 60 minutes at the temperature given by 30 pounds steam pressure per square inch. After vulcanizing and testing the cured rubber stocks, the materials hereinbefore set forth were each found to possess vulcanization accelerating properties typical of the class.

It is preferred, however, that the new class of accelerating material be employed in conjunction with a basic activating accelerator. Thus, separate rubber stocks were compounded, each stock comprising 100 parts of pale crepe rubber,
5 parts of zinc oxide,
3 parts of sulfur,
1 part of stearic acid,
0.2 part of diphenyl guanidine,
0.8 part of one of accelerators "A" to "F" as described below.

After vulcanizing, the cured rubber products were found to possess the tensile and modulus properties set forth in Table III. In the designation of "Accelerator" as appearing in Table III, "A" is the reaction product of substantially equi-molecular proportions of acetanilide-imido-chloride and the sodium salt of mercaptobenzothiazole. "B" is the reaction product of substantially equi-molecular proportions of benzoyl-p-toluidide-imido-chloride and the sodium salt of mercaptobenzothiazole. "C" is the reaction product of substantially equi-molecular proportions of benzoyl-alpha naphthylamide-imido-chloride and the sodium salt of mercaptobenzothiazole. "D" is the reaction product of substantially equi-molecular proportions of benzoyl-p-toluidide-imido-chloride and the sodium salt of mercaptotolylthiazole. "E" is the reaction product of substantially equi-molecular proportions of acet-p-toluidide-imido-chloride and the sodium salt of mercaptonaphthothiazole. "F" is the reaction product of substantially equi-molecular proportions acet-alpha-naphthylamide-imido-chloride and the sodium salt of mercaptobenzothiazole.

Table III

| Cure | | | Modulus of elasticity in lbs/in² at elongations of | | | Tensile at break in lbs/in² | Ultimate elongation |
|---|---|---|---|---|---|---|---|
| Accelerator | Time mins. | Steam pressure lbs. | 300% | 500% | 700% | | |
| | | | | | | | Percent |
| A | 30 | 30 | 344 | 1043 | 4025 | 4025 | 700 |
| B | 30 | 30 | 175 | 358 | 1575 | 3020 | 810 |
| C | 30 | 30 | 145 | 229 | 843 | 2265 | 875 |
| D | 30 | 30 | 146 | 240 | 763 | 2330 | 910 |
| E | 30 | 30 | 163 | 322 | 1240 | 2680 | 830 |
| F | 30 | 30 | 363 | 1145 | ------ | 3370 | 660 |
| A | 45 | 30 | 395 | 1100 | ------ | 4020 | 680 |
| B | 45 | 30 | 202 | 518 | 2440 | 3380 | 760 |
| C | 45 | 30 | 181 | 358 | 1503 | 3085 | 835 |
| D | 45 | 30 | 156 | 296 | 1190 | 3130 | 875 |
| E | 45 | 30 | 179 | 403 | 1850 | 3005 | 790 |
| F | 45 | 30 | 355 | 1065 | ------ | 3340 | 670 |
| A | 60 | 30 | 386 | 1105 | ------ | 3590 | 680 |
| B | 60 | 30 | 257 | 675 | 2790 | 3725 | 765 |
| C | 60 | 30 | 229 | 458 | 1780 | 3200 | 805 |
| D | 60 | 30 | 190 | 390 | 1520 | 3130 | 845 |
| E | 60 | 30 | 217 | 488 | 2150 | 3450 | 800 |
| F | 60 | 30 | 374 | 1155 | ------ | 3375 | 660 |

From the data hereinbefore set forth, it is readily seen that the preferred class of accelerating compounds comprising a reaction product of an acid amide imido halide and a mercaptothiazole comprises an important group of rubber vulcanization accelerators and that their accelerating properties are markedly increased when employed in conjunction with a basic activating accelerator to form a mixed accelerator.

In the preparation of the preferred class of compounds, other acid amide-imido halides than acid amide-imido-chlorides readily react with metallic salts of mercaptothiazoles to form the preferred class of compounds. I may employ the fluorides, the bromides, and the iodides of the acid amide-imido compounds described above. Further, in place of the sodium salt of a mercaptothiazole, the potassium, calcium, barium or other metallic salts of a mercaptothiazole and preferably an alkali salt thereof may be reacted with the acid amide-imido-halides hereinbefore set forth to form accelerators of the preferred class.

The present invention is limited solely by the claims attached hereto as a part of the present specification.

What is claimed is:

1. The process of treating rubber which comprises heating rubber and sulfur in the presence of an accelerator comprising a reaction product of an acid amide-imido-halide having the structural formula of

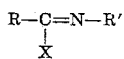

where R is a member of a group consisting in an unsubstituted alkyl radical and a hydrocarbon radical of the benzene series, R' is an aromatic hydrocarbon radical and X is a halogen atom and a mercaptothiazole as a constituent thereof.

2. The process of treating rubber which comprises heating rubber and sulfur in the presence of an accelerator comprising a reaction product of an acid amide-imido-halide having the structural formula of

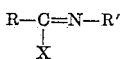

where R is a member of a group consisting in an unsubstituted alkyl radical and a hydrocarbon radical of the benzene series, R' is an aromatic hydrocarbon radical and X is a halogen atom and a mercaptoarylthiazole as a constituent thereof.

3. The process of treating rubber which comprises heating rubber and sulfur in the presence of an accelerator comprising a reaction product of an acid amide-imido-halide having the structural formula of

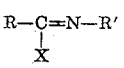

where R is a member of a group consisting in an unsubstituted alkyl radical and a hydrocarbon radical of the benzene series, R' is an aromatic hydrocarbon radical and X is a holagen atom and a mercaptobenzothiazole as a constituent thereof.

4. The process of treating rubber which comprises heating rubber and sulfur in the presence of an accelerator comprising a reaction product of an acid amide-imido-halide having the formula of

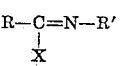

wherein R is a hydrocarbon radical of the benzene series, R' is an aromatic hydrocarbon radical and X is a halogen atom and a mercaptoarylthiazole as a constituent thereof.

5. The process of treating rubber which comprises heating rubber and sulfur in the presence of an accelerator comprising a reaction product of an acid amide-imido-halide having the formula of

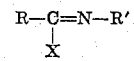

wherein R is a hydrocarbon radical of the benzene series, R' is an aromatic hydrocarbon radical and X is a halogen atom and a mercaptobenzothiazole as a constituent thereof.

6. The process of treating rubber which comprises heating rubber and sulfur in the presence of an accelerator comprising a reaction product of an acid amide-imido-halide having the formula of

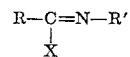

wherein R is a hydrocarbon radical of the benzene series, R' is an aromatic hydrocarbon radical and X is a halogen atom and an alkali metallic salt of mercaptobenzothiazole as a constituent thereof.

7. The process of treating rubber which comprises heating rubber and sulfur in the presence of an accelerator comprising a reaction product of benzanilide-imido-chloride and the sodium salt of mercaptobenzothiazole as a constituent thereof.

8. The process of treating rubber which comprises heating rubber and sulfur in the presence of an accelerator comprising a reaction product of substantially equi-molecular proportions of benzanilide-imido-chloride and the sodium salt of mercaptobenzothiazole.

9. The process of treating rubber which comprises heating rubber and sulfur in the presence of a mixed accelerator comprising a reaction product of an acid amide-imido-halide having the structural formula of

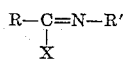

where R is a member of a group consisting in an unsubstituted alkyl radical and a hydrocarbon radical of the benzene series, R' is an aromatic hydrocarbon radical and X is a halogen atom and a mercaptothiazole admixed with a basic activating accelerator.

10. The process of treating rubber which comprises heating rubber and sulfur in the presence of a mixed accelerator comprising a reaction product of an acid amide-imido-halide having the structural formula of

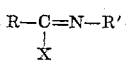

where R is a member of a group consisting in an unsubstituted alkyl radical and a hydrocarbon radical of the benzene series, R' is an aromatic hydrocarbon radical and X is a halogen atom and a mercaptoarylthiazole admixed with a basic activating aromatic amine accelerator.

11. The process of treating rubber which comprises heating rubber and sulfur in the presence of a mixed accelerator comprising a reaction product of an acid amide-imido-halide having the structural formula of

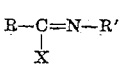

where R is a member of a group consisting in an unsubstituted alkyl radical and a hydrocarbon radical of the benzene series, R' is an aromatic hydrocarbon radical and X is a halogen atom and a mercaptobenzothiazole admixed with a basic activating aromatic amine accelerator.

12. The process of treating rubber which comprises heating rubber and sulfur in the presence of a mixed accelerator comprising a reaction product of an acid amide-imido-halide having the formula of $$R-C=N-R'$$
$$|$$
$$X$$

wherein R is a hydrocarbon radical of the benzene series, R' is an aromatic hydrocarbon radical and X is a halogen atom and a mercaptoarylthiazole admixed with a guanidine accelerator.

13. The process of treating rubber which comprises heating rubber and sulfur in the presence of a mixed accelerator comprising a reaction product of an acid amide-imido-halide having the formula of $$R-C=N-R'$$
$$|$$
$$X$$

wherein R is a hydrocarbon radical of the benzene series, R' is an aromatic hydrocarbon radical and X is a halogen atom and a mercaptobenzothiazole admixed with a diphenyl guanidine accelerator.

14. The process of treating rubber which comprises heating rubber and sulfur in the presence of a mixed accelerator comprising a reaction product of benzanilide-imido-chloride and the sodium salt of mercaptobenzothiazole admixed with diphenyl guanidine.

15. The process of treating rubber which comprises heating rubber and sulfur in the presence of a mixed accelerator comprising a reaction product of substantially equi-molecular proportions of benzanilide-imido-chloride and the sodium salt of mercaptobenzothiazole admixed with diphenyl guanidine.

16. The vulcanized rubber product prepared by heating rubber and sulfur in the presence of an accelerator comprising a reaction product of an acid amide-imido-halide having the structural formula of $$R-C=N-R'$$
$$|$$
$$X$$

where R is a member of a group consisting in an unsubstituted alkyl radical and a hydrocarbon radical of the benzene series, R' is an aromatic hydrocarbon radical and X is a halogen atom and a mercaptothiazole as a constituent thereof.

17. The vulcanized rubber product prepared by heating rubber and sulfur in the presence of an accelerator comprising a reaction product of an acid amide-imido-halide having the structural formula of $$R-C=N-R'$$
$$|$$
$$X$$

where R is a member of a group consisting in an unsubstituted alkyl radical and a hydrocarbon radical of the benzene series, R' is an aromatic hydrocarbon radical and X is a halogen atom and a mercaptoarylthiazole as a constituent thereof.

18. The vulcanized rubber product prepared by heating rubber and sulfur in the presence of an accelerator comprising a reaction product of an acid amide-imido-halide having the structural formula of $$R-C=N-R'$$
$$|$$
$$X$$

where R is a member of a group consisting in an unsubstituted alkyl radical and a hydrocarbon radical of the benzene series, R' is an aromatic hydrocarbon radical and X is a halogen atom and a mercaptobenzothiazole as a constituent thereof.

19. The vulcanized rubber product prepared by heating rubber and sulfur in the presence of an accelerator comprising a reaction product of an acid amide-imido-halide having the formula of $$R-C=N-R'$$
$$|$$
$$X$$

wherein R is a hydrocarbon radical of the benzene series, R' is an aromatic hydrocarbon radical and X is a halogen atom and a mercaptoarylthiazole as a constituent thereof.

20. The vulcanized rubber product prepared by heating rubber and sulfur in the presence of an accelerator comprising a reaction product of an acid amide-imido-halide having the formula of $$R-C=N-R'$$
$$|$$
$$X$$

wherein R is a hydrocarbon radical of the benzene series, R' is an aromatic hydrocarbon radical and X is a halogen atom and a mercaptobenzothiazole as a constituent thereof.

21. The vulcanized rubber product prepared by heating rubber and sulfur in the presence of an accelerator comprising a reaction product of an acid amide-imido-halide having the formula of $$R-C=N-R'$$
$$|$$
$$X$$

wherein R is a hydrocarbon radical of the benzene series, R' is an aromatic hydrocarbon radical and X is a halogen atom and an alkali metallic salt of mercaptobenzothiazole as a constituent thereof.

22. The vulcanized rubber product prepared by heating rubber and sulfur in the presence of an accelerator comprising a reaction product of benzanilide-imido-chloride and the sodium salt of mercaptobenzothiazole as a constituent thereof.

23. The vulcanized rubber product prepared by heating rubber and sulfur in the presence of an accelerator comprising a reaction product of substantially equi-molecular proportions of benzanilide-imido-chloride and the sodium salt of mercaptobenzothiazole.

24. The vulcanized rubber product prepared by heating rubber and sulfur in the presence of a mixed accelerator comprising a reaction product of an acid amide-imido-halide having the structural formula of $$R-C=N-R'$$
$$|$$
$$X$$

where R is a member of a group consisting in an unsubstituted alkyl radical and a hydrocarbon radical of the benzene series, R' is an aromatic hydrocarbon radical and X is a halogen atom and a mercaptothiazole admixed with a basic activating accelerator.

25. The vulcanized rubber product prepared by heating rubber and sulfur in the presence of a mixed accelerator comprising a reaction product of an acid amide-imido-halide having the structural formula of $$R-C=N-R'$$
$$|$$
$$X$$

where R is a member of a group consisting in an unsubstituted alkyl radical and a hydrocarbon radical of the benzene series, R' is an aromatic hydrocarbon radical and X is a halogen atom and a mercaptoarylthiazole admixed with a basic activating accelerator.

26. The vulcanized rubber product prepared by heating rubber and sulfur in the presence of a mixed accelerator comprising a reaction product of an acid amide-imido-halide having the structural formula of $$R-C=N-R'$$
$$\phantom{R-}|\phantom{=N-R'}$$
$$\phantom{R-C=N-}X$$

where R is a member of a group consisting in an unsubstituted alkyl radical and a hydrocarbon radical of the benzene series, R' is an aromatic hydrocarbon radical and X is a halogen atom and a mercaptobenzothiazole admixed with a basic activating aromatic amine accelerator.

27. The vulcanized rubber product prepared by heating rubber and sulfur in the presence of a mixed accelerator comprising a reaction product of an acid amide-imido-halide having the formula of $$R-C=N-R'$$
$$\phantom{R-}|\phantom{=N-R'}$$
$$\phantom{R-C=N-}X$$

wherein R is a hydrocarbon radical of the benzene series, R' is an aromatic hydrocarbon radical and X is a halogen atom and a mercaptoarylthiazole admixed with a guanidine accelerator.

28. The vulcanized rubber product prepared by heating rubber and sulfur in the presence of a mixed accelerator comprising a reaction product of an acid amide-imido-halide having the formula of $$R-C=N-R'$$
$$\phantom{R-}|\phantom{=N-R'}$$
$$\phantom{R-C=N-}X$$

wherein R is a hydrocarbon radical of the benzene series, R' is an aromatic hydrocarbon radical and X is a halogen atom and a mercaptobenzothiazole admixed with a diphenyl guanidine accelerator.

29. The vulcanized rubber product prepared by heating rubber and sulfur in the presence of a mixed accelerator comprising a reaction product of benzanilide-imido-chloride and the sodium salt of mercaptobenzothiazole admixed with diphenyl guanidine.

30. The vulcanized rubber product prepared by heating rubber and sulfur in the presence of a mixed accelerator comprising a reaction product of substantially equi-molecular proportions of benzanilide-imido-chloride and the sodium salt of mercaptobenzothiazole admixed with diphenyl guanidine.

GEORGE L. MAGOUN.